US012626187B2

(12) United States Patent
Yamada et al.

(10) Patent No.: US 12,626,187 B2
(45) Date of Patent: May 12, 2026

(54) LEARNING DEVICE, LEARNING METHOD, AND LEARNING PROGRAM

(71) Applicant: NTT, Inc., Tokyo (JP)

(72) Inventors: Masanori Yamada, Musashino (JP);
Sekitoshi Kanai, Musashino (JP);
Tomokatsu Takahashi, Musashino (JP);
Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 824 days.

(21) Appl. No.: 17/919,542

(22) PCT Filed: Apr. 20, 2020

(86) PCT No.: PCT/JP2020/017115
§ 371 (c)(1),
(2) Date: Oct. 18, 2022

(87) PCT Pub. No.: WO2021/214844
PCT Pub. Date: Oct. 28, 2021

(65) Prior Publication Data
US 2023/0162085 A1     May 25, 2023

(51) Int. Cl.
G06N 20/00 (2019.01)
(52) U.S. Cl.
CPC .................................... G06N 20/00 (2019.01)
(58) Field of Classification Search
CPC ...................................................... G06N 20/00
USPC ........................................................ 706/12
See application file for complete search history.

(56) References Cited

U.S. PATENT DOCUMENTS

| | | | | |
|---|---|---|---|---|
| 2016/0328253 A1* | 11/2016 | Majumdar | ............. | G06N 10/80 |
| 2019/0220733 A1* | 7/2019 | Fisher | .................... | G06N 3/044 |
| 2019/0378017 A1* | 12/2019 | Kung | ................... | G06N 3/0464 |
| 2020/0065703 A1* | 2/2020 | Nag | ........................ | G06F 9/542 |
| 2021/0256351 A1* | 8/2021 | Cao | ........................ | G06N 10/20 |

FOREIGN PATENT DOCUMENTS

JP        2008215881 A  *  9/2008

OTHER PUBLICATIONS

Machta et al., "Parameter Space Compression Underlies Emergent Theories and Predictive Models", ARXIV ID: 1303.6738, Mar. 27, 2013, pp. 1-14. (Year: 2013).*
Katsoulakis, et al., "Scalable Information Inequalities for Uncertainty Quantification", ARXIV ID: 1605.04184, May 13, 2016, pp. 1-35. ( Year: 2016).*
Fisher et al., "Boltzmann Encoded Adversarial Machines", ARXIV ID: 1804.08682, Apr. 23, 2018, pp. 1-17. (Year: 2018).*
Zhao et al., "A Confident Information First Principle for Parameter Reduction and Model Selection of Boltzmann Machines", IEEE Transactions on Neural Networks and Learning Systems, vol. 29, No. 5, May 2018, pp. 1608-1621. (Year: 2018).*

(Continued)

*Primary Examiner* — Hwei-Min Lu
(74) *Attorney, Agent, or Firm* — XSENSUS LLP

(57) ABSTRACT

A learning device includes processing circuitry configured to acquire data of which a label is predicted, and reduce, in a model representing a probability distribution of the label of the acquired data, a rank of a Fisher information matrix for the data to a value less than a predetermined value and learn the model.

9 Claims, 7 Drawing Sheets

(56)          References Cited

OTHER PUBLICATIONS

Faury et al., "Distributionally Robust Counterfactual Risk Minimization", ARXIV ID: 1906.06211, Jun. 14, 2019, pp. 1-13. (Year: 2019).*

Goibert et al., "Adversarial Robustness via Adversarial Label-Smoothing", ARXIV ID: 1906.11567, Jun. 27, 2019, pp. 1-12. (Year: 2019).*

Han, "Scalable Approximate Inference and Some Applications", A Thesis Submitted to the Faculty in partial fulllment of the requirements for the degree of Doctor of Philosophy in Computer Science, Dartmouth College, Hanover, New Hampshire, Oct. 2019. (Year: 2019).*

Dixit, "TMI: Thermodynamic inference of data manifolds", ARXIV ID: 1911.09776, Nov. 21, 2019, pp. 1-11. (Year: 2019).*

Kingma et al., "Auto-Encoding Variational Bayes", arXiv:1312.6114v10, Available Online On: https://arxiv.org/pdf/1312.6114.pdf, May 1, 2014, pp. 1-14.

Zhang et al., "The Limitations Of Adversarial Training and The Blind-Spot Attack", arXiv:1901.04684v1, Available Online On: https://arxiv.org/pdf/1901.04684.pdf, Jan. 15, 2019, pp. 1-16.

Tramèr et al., "Adversarial Training and Robustness for Multiple Perturbations", arXiv:1904.13000v1, Available Online On: https://arxiv.org/pdf/1904.13000v1.pdf, Apr. 30, 2019, pp. 1-22.

Belghazi et al., "Mutual Information Neural Estimation", arXiv:1801.04062v4, Available Online On: https://arxiv.org/pdf/1801.04062.pdf, Jun. 7, 2018, 18 pages.

International Search Report and Written Opinion mailed on Oct. 13, 2020, received for PCT Application PCT/JP2020/017115, filed on Apr. 20, 2020, 7 pages including English Translation.

* cited by examiner

Fig. 4

| data / model | clean | b clean | adv. | b adv. |
|---|---|---|---|---|
| clean | 9484/10000 (95%) | 9371/10000 (94%) | 0/10000 (0%) | 0/10000 (0%) |
| adv. | 8375/10000 (84%) | 7784/10000 (78%) | 4952/10000 (50%) | 3254/10000 (33%) |

Fig. 5

| r | robust acc | diff |
|---|---|---|
| 1 | 50 | 0 |
| 10 | 49 | −1 |
| 20 | 50 | 0 |
| 30 | 54 | 4 |
| 40 | 57 | 7 |
| 50 | 59 | 9 |
| 70 | 63 | 13 |
| 90 | 58 | 8 |
| 100 | 59 | 9 |
| 110 | 62 | 12 |
| 120 | 63 | 13 |
| 130 | 65 | 15 |
| 140 | 65 | 15 |
| 150 | 65 | 15 |

Fig. 6

| $\tau$ | clean acc | diff |
|---|---|---|
| 1 | 82 | 0 |
| 10 | 79 | -3 |
| 20 | 81 | -1 |
| 30 | 82 | 0 |
| 40 | 82 | 0 |
| 50 | 77 | -5 |
| 70 | 80 | -2 |
| 90 | 71 | -11 |
| 100 | 72 | -10 |
| 110 | 70 | -12 |
| 120 | 72 | -10 |
| 130 | 72 | -10 |
| 140 | 72 | -10 |
| 150 | 71 | -11 |

LEARNING DEVICE, LEARNING METHOD, AND LEARNING PROGRAM

CROSS-REFERENCE TO RELATED APPLICATION

The present application is based on PCT filing PCT/JP2020/017115, filed Apr. 20, 2020, the entire contents of which are incorporated herein by reference.

TECHNICAL FIELD

The present invention relates to a learning device, a learning method, and a learning program.

BACKGROUND ART

In recent years, machine learning is very successful. In particular, with the emergence of deep learning, machine learning is a dominant method in the fields of images and natural language.

On the other hand, it is known that deep learning is vulnerable to an attack by an adversarial example having malicious noise. As the mainstream of a countermeasure against the adversarial example, adversarial training is known (see NPLs 1 to 4).

CITATION LIST

Non Patent Literature

[NPL 1] D. P. Kingma, et. al., "Auto-Encoding Variational Bayes", [online], arXiv:1312.6114v10 [stat. ML], May 2014, [retrieved on Mar. 31, 2020], the Internet <URL: arxiv.org/pdf/1312.6114.pdf>

[NPL 2] H. Zhang et. al., "THE LIMITATIONS OF ADVERSARIAL TRAINING AND THE BLIND-SPOT ATTACK", [online], arXiv:1901.04684v1 [stat. ML], January 2019, [retrieved on Mar. 31, 2020], the Internet <URL: arxiv.org/pdf/1901.04684.pdf>

[NPL 3] F. Tramer, et. al., "Adversarial Training and Robustness for Multiple Perturbations", [online], arXiv:1904.13000v1 [cs. LG], April 2019, [retrieved on Mar. 31, 2020], the Internet <URL: arxiv.org/pdf/1904.13000v1.pdf>

[NPL 4] M. I. Belghazi, et. al., "Mutual Information Neural Estimation", [online], contribuarXiv:1801.04062v4 [cs. LG], June 2018, [retrieved on Mar. 31, 2020], the Internet <arxiv.org/pdf/1801.04062.pdf>

SUMMARY OF THE INVENTION

Technical Problem

However, in conventional adversarial training, it is known that a model obtained by the learning (hereinafter described as adv model) is lower in generalization capability than a model obtained by normal learning (hereinafter described as clean model). In addition, a countermeasure against an attack called a blind spot attack which attacks a weak point in the generalization capability is a problem.

The present invention has been made in view of the foregoing, and an object thereof is to learn a model which is robust to an adversarial example and is not fooled by a blind spot attack.

Means for Solving the Problem

In order to solve the above problem and attain the object, a learning device includes: processing circuitry configured to: acquire data of which a label is predicted, and reduce, in a model representing a probability distribution of the label of the acquired data, a rank of a Fisher information matrix for the data to a value less than a predetermined value and learn the model.

Effects of the Invention

According to the present invention, it becomes possible to learn the model which is robust to the adversarial example and is not fooled by the blind spot attack.

BRIEF DESCRIPTION OF DRAWINGS

FIG. 4 is a view for explaining an example.

FIG. 5 is a view for explaining the example.

FIG. 6 is a view for explaining the example.

DESCRIPTION OF EMBODIMENTS

Figure 1:
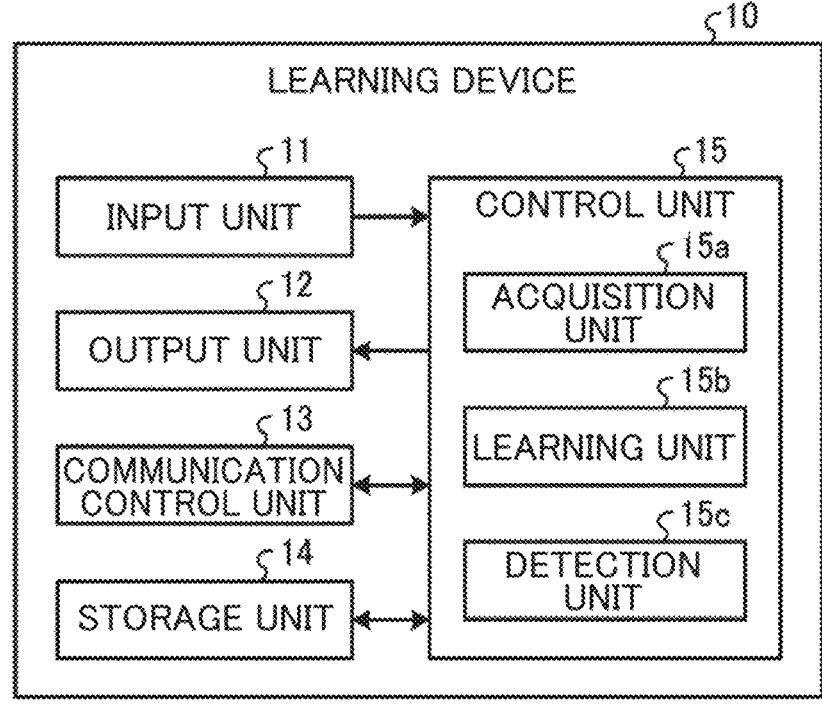
FIG. 1 is a schematic view showing, by way of example, the schematic configuration of a learning device.

Hereinbelow, an embodiment of the present invention will be described in detail with reference to the drawings. Note that the present invention is not limited by the embodiment. In addition, in the description of the drawings, the same portions are designated by the same reference numerals and shown.

[Configuration of Learning Device] FIG. 1 is a schematic view showing, by way of example, the schematic configuration of a learning device. As shown by way of example in FIG. 1, a learning device 10 is implemented by a general-purpose computer such as a personal computer, and includes an input unit 11, an output unit 12, a communication control unit 13, a storage unit 14, and a control unit 15.

The input unit 11 is implemented by using an input device such as a keyboard or a mouse, and inputs various pieces of instruction information such as processing start to the control unit 15 in response to an input operation by an operator. The output unit 12 is implemented by a display device such as a liquid crystal display or a printing device such as a printer.

The communication control unit 13 is implemented by an NIC (Network Interface Card) or the like, and controls communication between an external device such as a server and the control unit 15 via a network. For example, the communication control unit 13 controls communication between a management device which manages target data to be learned and the control unit 15.

The storage unit 14 is implemented by a semiconductor memory device such as a RAM (Random Access Memory) or a flash memory, or a storage device such as a hard disk or an optical disk, and stores a parameter and the like of a model learned by learning processing described later. Note that the storage unit 14 may also be configured to communicate with the control unit 15 via the communication control unit 13.

The control unit 15 is implemented by using a CPU (Central Processing Unit) or the like, and executes a processing program stored in a memory. With this, as shown by way of example in FIG. 1, the control unit 15 functions as an acquisition unit 15a, a learning unit 15b, and a detection unit 15c. Note that these functional units or part of the functional units may be provided in different pieces of hardware. For example, the learning unit 15b and the detection unit 15c may be provided as different devices. Alternatively, the acquisition unit 15a may be provided in a device different from the learning unit 15b and the detection unit 15c. In addition, the control unit 15 may include other functional units.

The acquisition unit 15a acquires data of which a label is predicted. For example, the acquisition unit 15a acquires data used in learning processing and detection processing described later via the input unit 11 or the communication control unit 13. In addition, the acquisition unit 15a may cause the storage unit 14 to store the acquired data. Note that the acquisition unit 15a may transfer the above information to the learning unit 15b or the detection unit 15c without causing the storage unit 14 to store the information.

In a model representing a probability distribution of the label of the acquired data, the learning unit 15b reduces the rank of a Fisher information matrix for the data to a value less than a predetermined value, and learns the model. Specifically, the learning unit 15b reduces the rank of the Fisher information matrix by increasing a temperature in a Boltzmann distribution to a value greater than 1 in the probability distribution of the label of the data.

Herein, the model representing the probability distribution of a label y of data x is represented by the following formula (1) by using a parameter $\theta$. f is a vector representing the label output by the model.

[Math. 1]

$$p_\theta(y_k \mid x) = \frac{\exp f_k(x; \theta)}{\sum_i \exp f_i(x; \theta)} \tag{1}$$

The learning unit 15b performs learning of the model by determining the parameter $\theta$ of the model such that a loss function represented by the following formula (2) is reduced. Herein, p(y|x) represents a true probability.

[Math. 2]

$$l(x,y;\theta)=p(y|x)\log p_\theta(y|x) \tag{2}$$

In addition, the learning unit 15b performs the learning of the model such that the label can be correctly predicted for an adversarial example represented by the following formula (3) in which noise $\eta$ is superimposed on the data x.

[Math. 3]

$$\max_\eta E_{x,y\sim p(x,y)}[l(x + \eta, y; \theta)] \tag{3}$$

That is, the learning unit 15b performs adversarial training by determining $\theta$ which satisfies the following formula (4).

[Math. 4]

$$\min_\theta\left(\max_\eta E_{x,y\sim p(x,y)}[l(x + \eta, y; \theta)]\right) \tag{4}$$

In a model obtained by conventional adversarial training (adv model), learning of mapping to a low-dimensional manifold is insufficient, and hence the model is considered to be lower in generalization capability than a model obtained by normal learning (clean model). To cope with this, the learning unit 15b of the present embodiment promotes low-dimensional learning by reducing the rank of the Fisher information matrix for the data x. For example, the learning unit 15b reduces the rank of the Fisher information matrix by using a temperature $\tau$ in the Boltzmann distribution and satisfying $\tau>1$ in the probability distribution of the above formula (1).

Herein, when the temperature $\tau$ in the Boltzmann distribution is used, the probability distribution of the above formula (1) is represented by the following formula (5).

[Math. 5]

$$p_\theta(y_k \mid x) = \frac{\exp\left(\frac{f_k(x; \theta)}{\tau}\right)}{\sum_i \exp\left(\frac{f_i(x; \theta)}{\tau}\right)} \tag{5}$$

In the conventional adversarial training, the loss function is generated by using $\tau=1$. The learning unit 15b of the present embodiment reduces the rank of the Fisher information matrix by using $\tau>1$. Subsequently, the learning unit 15b generates the loss function represented by the following formula (6) similarly to the conventional case, and performs the learning.

[Math. 6]

$$l(x,y)=\int dy p(y|x)\log p_\theta(x|y) \tag{6}$$

Specifically, the learning unit 15b generates the adversarial example of the above formula (3) by using $\tau=1$. In addition, the learning unit 15b performs the learning with the above formula (4) by using the generated adversarial example and the loss function of the above formula (6) which is generated by using $\tau>1$. That is, the learning unit 15b repeats the generation of the adversarial example and the learning until the loss function converges while $\tau$ is fixed. With this, in the learning unit 15b, low-dimensional learning is promoted, and it becomes possible to learn the model which is robust to the adversarial example and has improved generalization capability.

The detection unit 15c predicts the label of the acquired data by using the learned model. In this case, the detection unit 15c predicts the label of the newly acquired data by using $\tau=1$ and applying the learned parameter $\theta$ to the above formula (1). With this, it becomes possible for the detection unit 15c to resist a blind spot attack and predict a correct label for the adversarial example.

Figure 2:
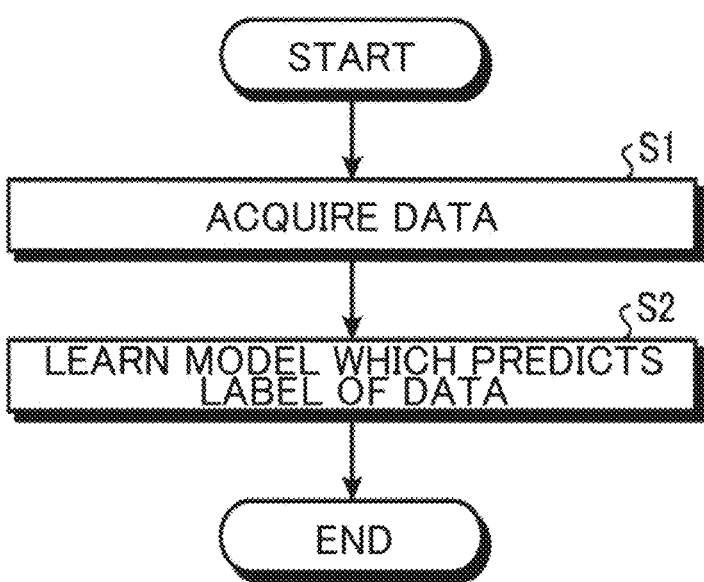
FIG. 2 is a flowchart showing learning processing procedure.

[Learning Processing] Next, with reference to FIG. 2, a description will be given of learning processing by the learning device 10 according to the present embodiment. FIG. 2 is a flowchart showing learning processing procedure. The flowchart in FIG. 2 is started at a timing when, e.g., an operation input for an instruction to start the learning processing is performed.

First, the acquisition unit 15a acquires data of which the label is predicted (Step S1).

Next, the learning unit 15b learns the model representing the probability distribution of the label of the acquired data (Step S2). At this point, in the model, the learning unit 15b reduces the rank of the Fisher information matrix for the data to a value less than a predetermined value, and learns the model. For example, the learning unit 15*b* reduces the rank of the Fisher information matrix by using the temperature τ in the Boltzmann distribution and using τ>1 in the above probability distribution, and performs the learning.

That is, the learning unit 15*b* performs the learning by using the adversarial example generated by using τ=1 and the loss function generated by using τ>1. The learning unit 15*b* repeats the generation of the adversarial example and the learning until the loss function converges while τ is fixed. With this, a series of the learning processing is ended.

Figure 3:
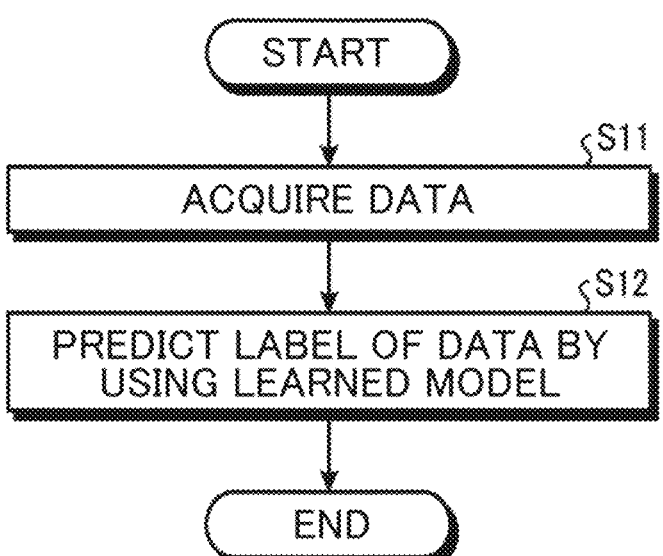
FIG. 3 is a flowchart showing detection processing procedure.

[Detection Processing] Next, with reference to FIG. 3, a description will be given of detection processing by the learning device 10 according to the present embodiment. FIG. 3 is a flowchart showing detection processing procedure. The flowchart in FIG. 3 is started at a timing when, e.g., an operation input for an instruction to start the detection processing is performed.

First, similarly to the processing step in Step S1 in FIG. 2 described above, the acquisition unit 15*a* acquires new data of which the label is predicted (Step S11).

Next, the detection unit 15*c* predicts the label of the acquired data by using the learned model (Step S12). In this case, the detection unit 15*c* predicts the label of the newly acquired data by using τ=1 and applying the learned parameter θ to the above formula (1). With this, a series of the detection processing is ended.

Thus, as described above, the acquisition unit 15*a* acquires the data of which the label is predicted. In the model representing the probability distribution of the label of the acquired data, the learning unit 15*b* reduces the rank of the Fisher information matrix for the data to a value less than a predetermined value and learns the model. For example, the learning unit 15*b* reduces the rank of the Fisher information matrix by increasing the temperature in the Boltzmann distribution to a value greater than 1 in the above-described probability distribution.

With this, in the learning device 10, it becomes possible for the learning unit 15*b* to learn the model which is robust to the adversarial example, has improved generalization capability, and is not fooled by the blind spot attack.

In addition, the detection unit 15*c* predicts the label of the acquired data by using the learned model. With this, it becomes possible for the detection unit 15*c* to resist the blind spot attack and predict the correct label for the adversarial example.

[Example] FIGS. 4 to 6 are views for explaining an example of the present invention. In the present example, by using an image data set: Cifar 10 and a deep learning model: Resnet 18, evaluation of correctness of the model of the embodiment described above was performed. Specifically, by using, as test data, normal data (hereinafter described as clean data) and an adversarial example (hereinafter described as adv data) generated by a method called PGD, evaluation of individual models including the model of the embodiment described above was performed.

As parameters of the PGD, esp=8/255, train_iter=7, eval_iter=20, eps_iter=0.01, rand_init=True, clip_min=0.0, and clip_max=1.0 were used.

In addition, in evaluation related to the blind spot attack, the evaluation of each model was performed by using x' (adversarial example) obtained by converting test data x according to the following formula (7).

[Math. 7]

$$x' = \text{alpha} \times x + \text{beta}, \qquad (7)$$
$$\text{alpha} = 0.7,$$
$$\text{beta} = 0.15$$

Subsequently, a top 1 accuracy for the test data x (hereinafter described as clean acc) and a top 1 accuracy for the adversarial example x' (hereinafter described as robust acc) were calculated.

FIG. 4 shows the evaluation result of each model which uses various pieces of data by way of example. The normal data (clean data), data (b clean data) obtained by converting the normal data according to the above formula (7), the adv data, and data (b adv data) obtained by converting the adv data according to the above formula (7) were used as the various pieces of data, and the correctness of each of a conventional normal model (clean model) and an adversarial training model (adv model) was evaluated.

As shown in FIG. 4, in the clean model, a difference between the correctness of 95% for the clean data and the correctness of 0% for the adv data is large. In contrast to this, in the adv model, the correctness for the adv data is improved to reach 50%, and it is possible to determine the effect of the adv model exerted on the adversarial example. On the other hand, the correctness for the b clean data is significantly reduced to 33%, and it can be seen that the generalization capability of the adv model is low, and the correctness is reduced in the case where the generalization capability is especially required such as the case of the blind spot attack.

Next, in FIG. 5, the robust acc at each temperature τ is shown by way of example as the evaluation result of the model of the present embodiment for the adversarial example. In addition, in FIG. 6, the clean acc at each temperature τ is shown by way of example as the evaluation result of the model of the present embodiment for the blind spot attack. In each of FIG. 3 and FIG. 4, diff denotes a difference between the robust acc or the clean acc and a value at τ=1 (conventional adv model).

As shown in FIG. 5 and FIG. 6, at τ=70 which was an optimal solution, while the robust acc was improved by 13% to reach 63%, the clean acc was reduced by 2% to 80%. In this case, the robust acc was increased by 23% from 28% to 51% for the blind spot attack, and the clean acc was reduced by 6% from 76% to 70%. Thus, in the model of the present embodiment, it was determined that the accuracy for the adv data was improved and a reduction in generalization capability was improved as compared with the evaluation result of the conventional adv model shown in FIG. 4.

[Program] It is also possible to create a program in which the processing executed by the learning device 10 according to the above embodiment is described in a language which allows execution by a computer. As an embodiment, the learning device 10 can be implemented by installing a learning program which executes the above-described learning processing in a desired computer as package software or online software. For example, it is possible to cause an information processing device to function as the learning device 10 by causing the information processing device to execute the above-described learning program. In addition, a mobile communication terminal such as a smartphone, a cellular phone, or a PHS (Personal Handyphone System) and a slate terminal such as a PDA (Personal Digital Assistant) are included in the category of the information processing device. In addition, the function of the learning device 10 may also be provided in a cloud server.

Figure 7:
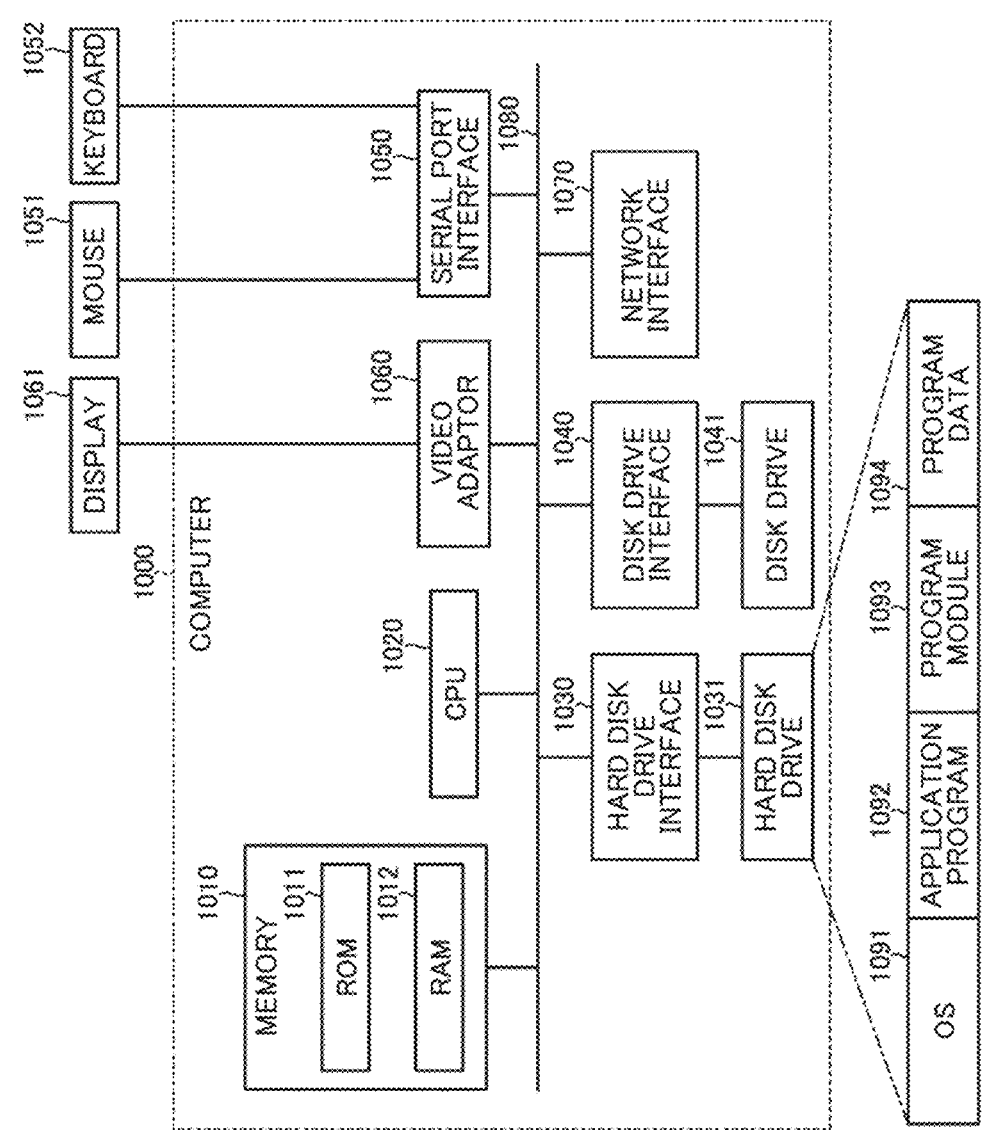
FIG. 7 is a view showing, by way of example, a computer which executes a learning program.

FIG. 7 is a view showing an example of the computer which executes the learning program. A computer 1000 has, e.g., a memory 1010, a CPU 1020, a hard disk drive interface 1030, a disk drive interface 1040, a serial port interface 1050, a video adaptor 1060, and a network interface 1070. The individual units are connected by a bus 1080.

The memory 1010 includes a ROM (Read Only Memory) 1011 and a RAM 1012. The ROM 1011 stores, e.g., a boot program such as a BIOS (Basic Input Output System). The hard disk drive interface 1030 is connected to a hard disk drive 1031. The disk drive interface 1040 is connected to a disk drive 1041. Into the disk drive 1041, a detachable storage medium such as, e.g., a magnetic disk or an optical disk is inserted. To the serial port interface 1050, e.g., a mouse 1051 and a keyboard 1052 are connected. To the video adaptor 1060, e.g., a display 1061 is connected.

Herein, the hard disk drive 1031 stores, e.g., an OS 1091, an application program 1092, a program module 1093, and program data 1094. Each information described in the embodiment described above is stored in, e.g., the hard disk drive 1031 and the memory 1010.

In addition, the learning program is stored in the hard disk drive 1031 as the program module 1093 in which, e.g., a command executed by the computer 1000 is described. Specifically, the program module 1093 in which each processing executed by the learning device 10 described in the above embodiment is described is stored in the hard disk drive 1031.

In addition, data used in information processing by the learning program is stored in, e.g., the hard disk drive 1031 as the program data 1094. The CPU 1020 reads the program module 1093 and the program data 1094 stored in the hard disk drive 1031 into the RAM 1012 on an as needed basis, and executes each procedure described above.

Note that the storage of the program module 1093 and the program data 1094 related to the learning program is not limited to the case where the program module 1093 and the program data 1094 are stored in the hard disk drive 1031, and the program module 1093 and the program data 1094 may be stored in, e.g., a detachable storage medium and may be read by the CPU 1020 via the disk drive 1041. Alternatively, the program module 1093 and the program data 1094 related to the learning program may also be stored in another computer connected via a network such as a LAN (Local Area Network) or a WAN (Wide Area Network) and may be read by the CPU 1020 via the network interface 1070.

The embodiment to which the invention made by the present inventors is applied has been described thus far, but the present invention is not limited by the description and the drawings which constitute part of the disclosure of the present invention by the present embodiment. That is, other embodiments, examples, and operation techniques which are made by those skilled in the art based on the present embodiment are all included in the scope of the present invention.

REFERENCE SIGNS LIST

10 Learning device
11 Input unit
12 Output unit
13 Communication control unit
14 Storage unit
15 Control unit
15*a* Acquisition unit

15*b* Learning unit
15*c* Detection unit

The invention claimed is:

1. A learning device comprising:
processing circuitry configured to:
    acquire training data of which a label is predicted;
    generate a model, representing a probability distribution of the label of the training data, to resist an adversarial example by:
        increasing a temperature in a Boltzmann distribution to a value greater than 1 in the probability distribution, and
        learning the model;
    receive input data of which a label is to be predicted; and
    predict the label of the input data by using the learned model.

2. The learning device of claim 1, wherein the processing circuitry is further configured to perform the learning using the adversarial example that is generated by superimposing noise on the training data.

3. The learning device of claim 1, wherein the processing circuitry is further configured to perform the learning by generating the adversarial example using a first temperature value in the probability distribution and updating the model using a loss function generated with a second temperature value that is greater than the first temperature value.

4. The learning device of claim 3, wherein the first temperature value is 1.

5. The learning device of claim 1, wherein the processing circuitry is further configured to predict the label of the input data by setting a temperature value in the probability distribution to 1.

6. The learning device of claim 1, wherein the processing circuitry is further configured to perform the learning by performing an iterative process of generating the adversarial example and updating the model until a loss function converges.

7. The learning device of claim 1, wherein the processing circuitry is further configured to perform the learning by reducing a loss function that is based on a true probability of the label of the training data and a probability predicted by the model.

8. A learning method which is executed in a learning device, the learning method comprising:
    acquiring training data of which a label is predicted;
    generating a model, representing a probability distribution of the label of the training data, to resist an adversarial example by:
        increasing a temperature in a Boltzmann distribution to a value greater than 1 in the probability distribution, and
        learning the model;
    receiving input data of which a label is to be predicted; and
    predicting the label of the input data by using the learned model.

9. A non-transitory computer-readable recording medium storing therein a learning program that causes a computer to execute a process comprising:
    acquiring training data of which a label is predicted;
    generating a model, representing a probability distribution of the label of the training data, to resist an adversarial example by:

increasing a temperature in a Boltzmann distribution to a value greater than 1 in the probability distribution, and learning the model;

receiving input data of which a label is to be predicted; and predicting the label of the input data by using the learned model.

* * * * *